Figures 1, 2:
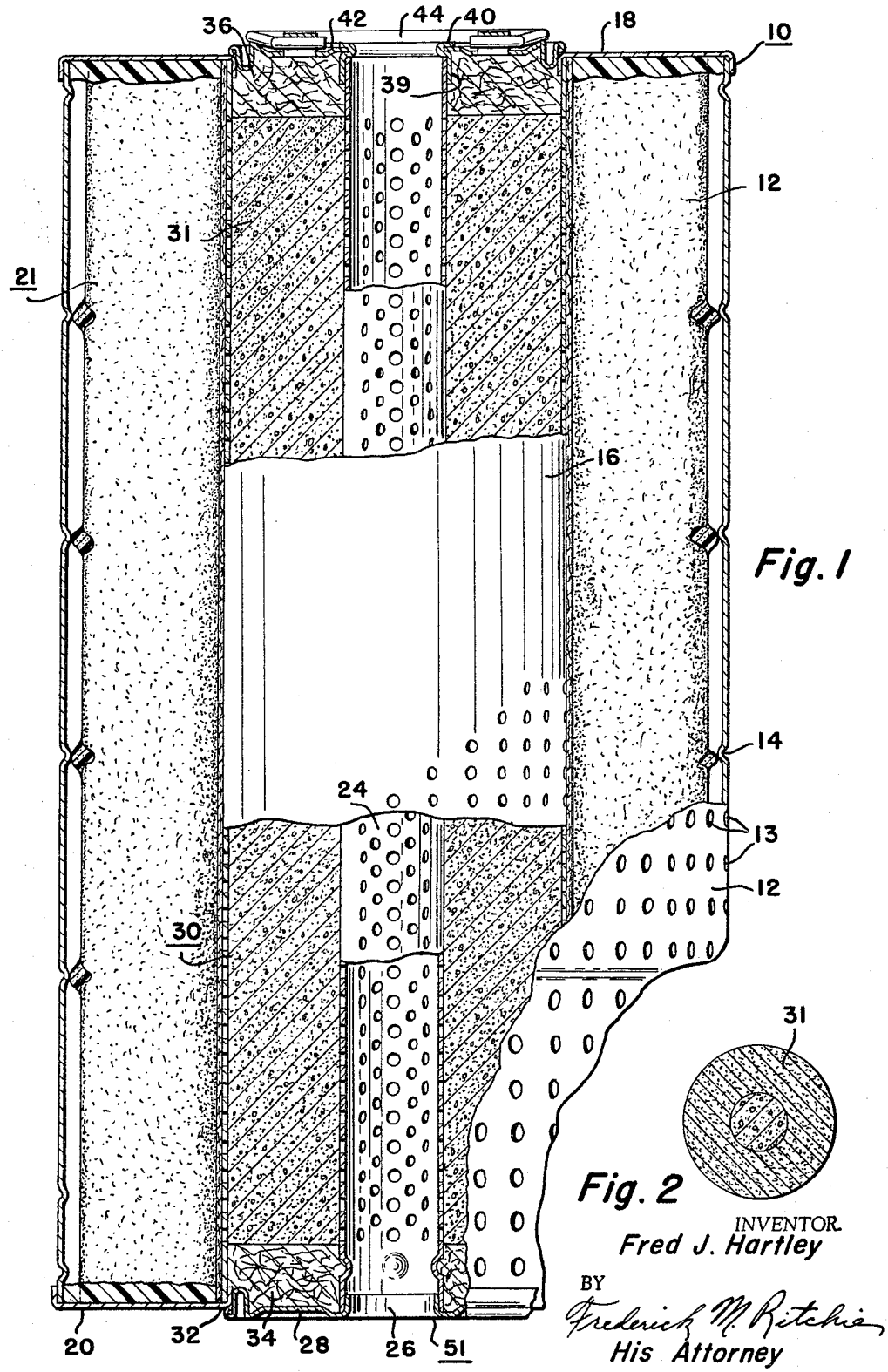

INVENTOR.
Fred J. Hartley 3,263,812
DRY CLEANING APPARATUS
Fred J. Hartley, Columbiaville, Mich., assignor to General Motors Corporation, Detroit, Mich., a corporation of Delaware
Filed Aug. 12, 1963, Ser. No. 301,543
5 Claims. (Cl. 210—209)

This invention relates to dry cleaning apparatus and more particularly to an improved filter cartridge for use in filtering and conditioning dry cleaning solvent.

Filter cartridges for dry cleaners generally are comprised of a paper filtering material and a granular dye adsorbing material such as activated carbon. The granular carbon fines tend to migrate from the cartridge into the solvent and streak clothes during the dry cleaning thereof. This invention deals with an improved form of carbon granule for use in the filter cartridge to overcome this problem. Before the granular carbon is added to the cartridge, it is coated with a given amount of liquid detergent or dry cleaning "soap." The coated carbon may then be added to the canister of the filter cartridge.

Accordingly, it is an object of this invention to provide a granular material for a filter cartridge which has been treated in a manner to prevent the abrading effect of one granule rubbing against another.

It is also an object of this invention to provide a filter cartridge having carbon granules, each granule having a coating which, in addition to protecting the granule during handling of the cartridge, is dispensible from the cartridge into the dry cleaning solvent.

Further objects and advantages of the present invention will be apparent from the following description, reference being had to the accompanying drawings wherein a preferred embodiment of the present invention is clearly shown.

In the drawings:

FIGURE 1 is a fragmentary sectional view, partly in elevation, of a disposable filter cartridge made in accordance with this invention; and FIGURE 2 is a sectional view of a detergent coated carbon granule for use in the filter cartridge of FIGURE 1.

In accordance with this invention and with reference to FIGURE 1, a cleaning fluid filter element assembly or cartridge 10 approximately 14 inches long by 7.6 inches in diameter is illustrated which is suitable for use with the dry cleaner disclosed in copending application Serial No. 285,189, filed May 27, 1963, now Patent No. 3,132,501, issued May 12, 1964, and assigned to the same assignee as this invention. The cartridge 10 is adapted to be placed in intercepting relationship with dry cleaning solvent, such as perchloroethylene, and is adapted to be removable and disposable when its resistance to solvent flow radially inwardly therethrough exceeds a certain predetermined value.

The cartridge 10 is comprised of an inside lock-seamed, cylindrical, perforated, outer shell 12 having several radially inwardly directed grooves 14 for spacing certain internal components of the cartridge as will be described hereinafter. The outer shell may be tin plate and should have a plurality of spaced holes or ports 13, .187 inch in diameter, over its entire surface except where the grooves or internal beads 14 are formed. The outer perforated shell serves to protect the filter cartridge, holds the cartridge together and acts as the inlet for the solvent moving radially inwardly through the cartridge.

A perforated cylindrical support or separator tube 16 of tin plate is spaced from the outer shell 12 by an annular upper end plate 18 and an annular lower end plate 20 also of tin plate and parallel to said upper end plate. The perforated cylinders 12 and 16 form therebetween a first stage solvent filtering chamber 21 to receive a tubular element 22 of folded or accordion plaited filter paper. The paper filter element 22 is adapted to remove from the solvent such contaminants as dirt, lint, hair, etc., i.e. particulate matter.

A cylindrical center or outlet tube 24 of tin plate is perforated with 0.12 inch diameter holes over its entire surface and fastened as by spot welding in the middle of the cartridge on an inturned cylindrical collar 26 of an otherwise imperforate lower cover 28. The center tube 24 defines with the separator or support tube 16 a second stage or solvent conditioning chamber 30. A metal ferrule 39 is spot welded to the top of the center tube 24 and includes an initially cylindrical flange 40 which is subsequently spun or crimped over to fasten the tube at the other end of the cartridge. The lower cover 28 is formed like a paint can lid at its outer periphery to frictionally engage in a press fit the inner peripheral edge 32 of the lower end plate 20. This, then, completes the lower cover and center tube assembly 51 comprised of the lower cover 28, center tube 24 and ferrule 39.

The solvent conditioning chamber 30 is filled with approximately two pounds of activated carbon 31 which is granular in form and effective to remove dyes and other dissolved contaminants. To retain the granular carbon, the solvent conditioning chamber 30 is sealed at its lower end by an annular lower end pad 34 of jute or other suitable material while the upper end of the chamber 30 is sealed by an annular end pad 36 also of jute.

A top cover 42 having a rolled edge, paint can lid type design frictionally engages the radially inner peripheral edge of the upper end plate 18 and includes a central opening for receiving the spun over flange 40 of the ferrule 39 to lock the cover 42 in place. A bail or other suitable handle 44 may be fastened to the top cover 42 in any suitable manner to facilitate handling of the cartridge 10. Cooperating with the end pads 34 and 36 in sealing and protecting the solvent conditioning chamber 30 is the method of treating the granular carbon 31 in accordance with the concepts of this invention as will be described next following.

If the granular-type activated carbon is not properly contained in the replaceable dry cleaning filter element, the fine carbon particulates will migrate from the filter cartridge by way of the center outlet tube 24. This migrated carbon can streak the clothes being dry cleaned with the fine carbon particles.

This problem is aggravated by the vibration of the filter cartridge due to handling and shipping thereof. Such vibration or jiggling tends to grind the carbon granules against themselves into ever smaller particles. The smaller the particle, the more the carbon migration and therefore the more carbon streaking of the clothes being cleaned. It is to the solution of this problem that one aspect of the invention is directed.

The proper operation of an effective dry cleaning system requires that all soil, both water soluble and solvent soluble, be removed from the garments being cleaned.

For this reason perchlorethylene and detergent are frequenly combined in a water-solvent solution to perform the cleaning task. The problem of adding detergent to the solvent is also solved by the improved filter cartridge of this invention.

The improvement of this invention deals with the carbon stage 31 of the filter cartridge 10. Before the granular carbon is added to the solvent conditioning chamber 30, each of the granules is coated with a given amount of liquid detergent or dry cleaning "soap." The coated carbon granules are then used to fill the chamber 30 and the cartridge is completed with the placement of lid 42 thereon to close the one end of chamber 30.

Any detergent may be used which is suitable for use with dry cleaning solvent; a detergent which is effective to coat the separate granules of carbon in a manner to minimize abrasion therebetween and the self-grinding thereof into smaller particles; and a detergent which is dispensible or washed from the carbon granule and the filter cartridge into the dry cleaning solvent as the solvent passes through the filter cartridge.

Examples of such detergents, but not by way of limitation, are the sodium, potassium or isopropylamine salts of organic phosphate ester types; nonyl phenol ethylene oxide types; salts of alkyl benzene sulfonic acid types; fatty acid polyglycol types; fatty acid alkanolamines; alkyl-aryl ethers of poly ethylene glycol. Generally, the commercially available dry cleaning detergents are compounded of more than one type and all of these, to the best of my knowledge, are suitable for use in coating the carbon granules of the filter cartridge of this invention.

It should now be seen that an improved filter cartridge has been provided for use with a dry cleaner. The addition of a detergent coating to the carbon granule effects three major advantages. (1) Since each carbon granule is coated with a layer of detergent, vibration due to handling and shipping of the filter cartridge does not tend to grind the carbon into finer particles. (2) The carbon fines, present in commercially available granular carbon, are tied down by the detergent solution. This reduces the amount of carbon migration from the filter cartridge when it is first used. (3) Since the detergent is being added as a component of the filter cartridge, the operator of the dry cleaning apparatus does not have to add the detergent manually to the dry cleaning solvent.

While the embodiment of the present invention as herein disclosed constitutes a preferred form, it is to be understood that other forms might be adopted.

What is claimed is as follows:

1. A disposable cartridge for use with dry cleaning solvent comprising
   (a) a perforated outer shell adapted to receive solvent to be filtered and conditioned,
   (b) a perforated inner tube inside of said outer shell and having one end open for dispensing conditioned solvent therethrough,
   (c) a perforated support tube interposed between said outer shell and said inner tube,
   (d) an imperforate end plate at each end of said cartridge connecting said outer shell and said support tube in spaced relationship respectively along the outer and inner peripheral edges of said end plates to define a solvent filtering chamber and a center cavity,
   (e) a first cover engaging the inner peripheral edge of one of said end plates for partially closing one end of said center cavity and having solvent outlet means in communication with said one end of said inner tube, said inner tube being fastened at said one end to said first cover in a manner to support said inner tube in said center cavity thereby to define with said support tube a solvent conditioning chamber,
   (f) a tube of longitudinally folded filter paper in said filtering chamber for removing particulate matter from solvent flowing therethrough,
   (g) reactive granules in granular form in said conditioning chamber for removing nonparticulate matter from solvent flowing therethrough,
   (h) a second cover engaging the inner peripheral edge of the other of said end plates for at least partially closing the other end of said center cavity,
   (i) means for supporting the other end of said inner tube in fixed relation to said second cover,
   (j) and means for sealing said reactive granules in said conditioning chamber, said means including plug means at each end of said conditioning chamber extending from said support tube to said inner tube and liquid detergent individually precoated on said granules for preventing abrasive contact between said granules during handling of said cartridge and for stabilizing said granules before use of said cartridge, said detergent being dispensible from said cartridge into the solvent during use of said cartridge for conditioning said solvent.

2. The cartridge of claim 1 wherein said reactive granules are activated carbon.

3. A disposable cartridge for use with dry cleaning solvent comprising
   (a) a perforated outer shell adapted to receive solvent to be filtered and conditioned,
   (b) a perforated inner tube inside of said outer shell for dispensing conditioned solvent therethrough,
   (c) a perforated support tube interposed between said outer shell and said inner tube,
   (d) means connecting said outer shell and said support tube in spaced relationship to define a solvent filtering chamber and a center cavity,
   (e) means connecting said support tube and said inner tube in spaced relationship with said inner tube in said cavity thereby to define with said support tube a solvent conditioning chamber,
   (f) means in said filtering chamber for removing particulate matter from solvent flowing therethrough,
   (g) reactive carbon granules in granular form in said conditioning chamber for removing nonparticulate matter from solvent flowing therethrough,
   (h) and means for sealing said reactive granules in said conditioning chamber, said means including liquid detergent individually precoated on said granules for preventing abrasive contact between said granules during handling of said cartridge and for stabilizing said granules before ues of said cartridge, said detergent being dispensible from said cartridge into the solvent during use of said cartridge for conditioning said solvent.

4. A disposable cartridge for use with dry cleaning solvent comprising
   (a) a perforated outer shell adapted to receive solvent to be filtered and conditioned,
   (b) a perforated inner tube inside of said outer shell for dispensing conditioned solvent therethrough,
   (c) a perforated support tube interposed between said outer shell and said inner tube,
   (d) means connecting said outer shell and said support tube in spaced relationship to define a solvent filtering chamber and a center cavity,
   (e) means connecting said support tube and said inner tube in spaced relationship with said inner tube in said cavity thereby to define with said support tube a solvent conditioning chamber,
   (f) means in said filtering chamber for removing particulate matter from solvent flowing therethrough,
   (g) reactive granules in granular form in said conditioning chamber for removing nonparticulate matter from solvent flowing therethrough,
   (h) and means for sealing said reactive granules in said conditioning chamber including protective means individually precoated on said granules for preventing abrasive contact between said granules during handling of said cartridge and for stabilizing said granules before use of said cartridge, said protective means being dispensible from said cartridge into the solvent during use of said cartridge.

5. A filter cartridge comprising means forming a solvent conditioning chamber adapted to receive a flow of dry cleaning solvent therethrough, a plurality of granules in granular form in said chamber adapted to condition the solvent flowing through said chamber, and protective means covering said granules to prevent abrasion between said granules before solvent flow through said chamber and dispensible from said granules into said solvent during solvent flow through said chamber.

References Cited by the Examiner

UNITED STATES PATENTS

| | | | |
|---|---|---|---|
| 3,156,648 | 11/1964 | Brucken et al. | 210—457 X |
| 3,189,179 | 6/1965 | McMichael | 210—315 X |
| 3,212,641 | 10/1965 | Komarmy et al. | 210—266 |

REUBEN FRIEDMAN, *Primary Examiner.*

SAM ZAHARNA, *Examiner.*